United States Patent [19]

Suzuki

[11] Patent Number: 4,868,813
[45] Date of Patent: Sep. 19, 1989

[54] PACKET CONCENTRATOR AND SWITCH INCLUDING A CONTROLLER FOR ASSIGNING PRIORITIES TO SPACE SWITCH INPUT TERMINALS FOR CONTROL OF BUFFERS

[75] Inventor: Hiroshi Suzuki, Tokyo, Japan

[73] Assignee: NEC Corporation, Tokyo, Japan

[21] Appl. No.: 292,951

[22] Filed: Jan. 3, 1989

[30] Foreign Application Priority Data

Jan. 6, 1988 [JP] Japan .................................. 63-1475

[51] Int. Cl.⁴ .......................... H04Q 11/04; H04J 3/26
[52] U.S. Cl. ....................................... 370/160; 370/56
[58] Field of Search ............................. 370/60, 94, 56

[56] References Cited

U.S. PATENT DOCUMENTS

| | | | |
|---|---|---|---|
| 4,566,095 | 1/1986 | Devault et al. ...................... | 370/94 |
| 4,621,359 | 11/1986 | McMillen ............................ | 370/94 |
| 4,754,451 | 6/1988 | Eng et al. ............................ | 370/60 |
| 4,760,570 | 7/1988 | Acampora et al. .................. | 370/60 |

OTHER PUBLICATIONS

"The Knockout Switch: A Simple, Modular Architecture for High-Performance Packet Switching," Yu-Shuan Yeh, IEEE Journal on Selected Areas in Communications, vol. SAC-5, No. 8, Oct. 1987, pp. 1274–1283.

*Primary Examiner*—Douglas W. Olms

*Attorney, Agent, or Firm*—Foley & Lardner, Schwartz, Jeffery, Schwaab, Mack, Blumenthal & Evans

[57] ABSTRACT

In a packet concentrating arrangement which comprises a space switch (33) having N input terminals and N output terminals, an input device (34) for supplying the input terminals with up to N simultaneous packets in each of successive time periods, N buffers (31) connected to the respective output terminals to buffer, as buffered packets, the simultaneous packets delivered to the output terminals in the successive time periods, and a selector (32) for reading the buffered packets one at a time cyclically from the buffers, a controller (35) is connected to the input device to assign priorities to the input terminals supplied with the up to N simultaneous packets and to cyclically select the output terminals which should be connected to the input terminals assigned with the priorities. The packet concentrating arrangement may comprise first through M-th space switches controlled in this manner and a single space switch which has M input terminals connected to first through M-th selectors associated with the buffers used in connection with the first through the M-th space switches and M output terminals and is similarly controlled. Between incoming and outgoing terminals, a packet switching arrangement may comprise such a packet concentrating arrangement for supplying the buffered jackets one at a time to each outgoing terminal.

10 Claims, 8 Drawing Sheets

| INPUT TERMINAL | ARRIVAL | A | B |
|---|---|---|---|
| 1 | 1 | 1 | 2 |
| 2 | 0 | X | X |
| 3 | 1 | 2 | 5 |
| 4 | 1 | 3 | 4 |
| 5 | 1 | 4 | 1 |
| 6 | 1 | 5 | 6 |
| 7 | 0 | X | X |
| 8 | 1 | 6 | 3 |

PACKET CONCENTRATOR AND SWITCH INCLUDING A CONTROLLER FOR ASSIGNING PRIORITIES TO SPACE SWITCH INPUT TERMINALS FOR CONTROL OF BUFFERS

BACKGROUND OF THE INVENTION

This invention relates to a packet concentrating arrangement and a packet switching arrangement for use in a packet communication network in which fixed-length packets of information are propagated through communication channels.

In the manner which will later be described a little more in detail, a "knockout" switch is disclosed as a packet switching arrangement by Anthony Acampora et al in U.S. Pat. No. 4,760,570. Its operation is discussed in an article contributed by Yu-Shuan Yeh et al to IEEE Journal of Selected Areas in Communications, Volume SAC-5, No. 8 (Oct. 1987), pages 1274 to 1283, under the title of "The Knockout Switch; A Simple, Modular Architecture for High-Performance Packet Switching".

According to the Acampora et al patent, the knockout switch comprises N input terminals and N output terminals, where N represents a predetermined integer. The input terminals are for receiving N input signals, each comprising fixed-length packets in a time division sequence. A destination of the time division sequence is indicated in at least one packet. In accordance with the destination, the packets are directed through broadcast busses to a terminal group of N intermediate terminals. Such terminal groups are N in number.

A packet concentrating arrangement is connected to the terminal group and to one of the output terminals. It is therefore possible to understand that the packet concentrating arrangement comprises N "incoming" terminals and an "outgoing" terminal. A concentrator has N input ports and L output ports, where L is not greater than N. An input device is connected to the incoming terminals and to the input ports to supply packets arriving at the incoming terminals to the input ports as up to N simultaneous packets in each of successive time periods. Through a shifter, L buffers are connected to the respective output ports to buffer, as buffered packets, the simultaneous packets delivered in the concentrator from the input ports to the output ports in at least one of the time periods. A selector cyclically selects the buffers to successively supply the outgoing terminal with the buffered packets one at a time.

The knockout switch is operable with a reduced number of buffers with the buffers shared by the N incoming terminals. The knockout switch is thereby operable with a high buffer efficiency and at a high speed.

It should, however, be noted in connection with the knockout switch that the concentrator and the shifter are used as a two-stage space switch. Due to use of the space switches in two stages, the knockout switch becomes bulky and difficult to control. Usually, the output ports are less in number than the input ports. As a result, some of the simultaneous packets are discarded or lost while being processed by the concentrator. Moreover, the concentrator is complicated in structure because the concentrator comprises binary switches in a plurality of stages.

SUMMARY OF THE INVENTION

It is therefore an object of the present invention to provide a packet concentrating arrangement which is simple in structure and is readily controlled.

It is another object of this invention to provide a packet concentrating arrangement of the type described, which comprises a space switch of only one stage.

It is still another object of this invention to provide a packet concentrating arrangement of the type described, in which simultaneous packets are hardly lost.

It is yet another object of this invention to provide a packet switching arrangement which comprises a plurality of packet concentrating arrangements of the type described.

Other objects of this invention will become clear as the description proceeds.

On describing the gist of this invention, it is possible to understand that a packet concentrating arrangement includes: (a) an outgoing terminal; (b) N incoming terminals, where N represents a predetermined integer; (c) a space switch having N input terminals and N output terminals for controllably establishing connection between the input and the output terminals; (d) input means connected to the incoming terminals and to the input terminals for supplying packets arriving at the incoming terminals to the input terminals as up to N simultaneous packets in each of successive time periods; (e) N buffers connected to the respective output terminals to buffer, as buffered packets, the simultaneous packets delivered from the input terminals to the output terminals in the space switch in at least one of the time periods; and (f) a selector for cyclically selecting the buffers to successively supply the outgoing terminal with the buffered packets one at a time.

According to a first aspect of this invention, the above-understood packet concentrating arrangement comprises control means connected to the input means and to the space switch for controlling the space switch so that the connection be established in the space switch in accordance with priorities assigned to the input terminals supplied with the up to N simultaneous packets.

It is possible to alternatively understand that a packet concentrating arrangement includes: (a) an outgoing terminal; (b) a plurality of incoming terminals divided into first through M-th terminal groups, an m-th terminal group consisting of N incoming terminals, where M represents a predetermined integer, m being variable between 1 and M, both inclusive, N representing an integer selected for each of the terminal groups; (c) first through M-th internal terminals corresponding to the first through the M-th terminal groups, respectively, an m-th internal terminal corresponding to the m-th terminal group; (d) first through M-th space switches corresponding to the first through the M-th terminal groups, respectively, an m-th space switch corresponding to the m-th terminal group and having N input terminals and N output terminals for controllably establishing connection between the input and the output terminals; (e) primary input means connected to the plurality of incoming terminals and to the input terminals of the space switches for supplying packets arriving at the incoming terminals of the m-th terminal group to the input terminals of the m-th space switch as up to N primary simultaneous packets in each of successive time periods; (f) N primary buffers connected to the respective output terminals of the m-th space switch to buffer, as primary buffered packets, the primary simultaneous packets delivered from the input terminals to the output terminals in the m-th space switch in at least one of the time periods; (g) a primary selector for cyclically selecting the primary buffers to successively supply the m-th internal terminal with the primary buffered packets as intermediate packets one at a time; (h) a single space switch having M input terminals and M output terminals for controllably establishing connection between the input and the output terminals of the single space switch; (i) secondary input means connected to the first through the M-th internal terminals and to the input terminals of the single space switch for supplying the intermediate packets supplied to the first through the M-th internal terminals to the input terminals of the single space switch as up to M secondary simultaneous packets in each of the time periods; (j) M secondary buffers connected to the respective output terminals of the single space switch to buffer, as secondary buffered packets, the secondary simultaneous packets delivered from the input terminals to the output terminals in the single space switch in at least one of the time periods; and (k) a secondary selector for cyclically selecting the secondary buffers to successively supply the outgoing terminal with the secondary buffered packets one at a time.

According to a second aspect of this invention, the alternatively understood packet concentrating arrangement comprises: (A) primary control means connected to the primary input means and to the m-th space switch for controlling the m-th space switch so that the connection be established in the m-th space switch in accordance with primary priorities assigned to the input terminals supplied with the up to N primary simultaneous packets and (B) secondary control means connected to the secondary input means and to the single space switch for controlling the single space switch so that the connection be established in the single space switch in accordance with secondary priorities assigned to the input terminals supplied with the up to M secondary simultaneous packets.

On describing the gist of other aspects of this invention, it is possible to understand that a packet switching arrangement includes: (a) M incoming terminals and first through M-th outgoing terminals, where M represents a predetermined integer; (b) a plurality of intermediate terminals divided into first through M-th terminal groups corresponding to the first through the M-th outgoing terminals, respectively, an m-th terminal group corresponding to an m-th outgoing terminal and consisting of N intermediate terminals, where m is variable between 1 and M, both inclusive, N representing an integer selected for each of the terminal groups; (c) broadcasting means connected to the incoming terminals and to the intermediate terminals of the terminal groups for broadcasting packets arriving at the incoming terminals to the intermediate terminals of selected ones of the terminal groups according to destinations indicated by the respective packets; (d) first through M-th space switches corresponding to the first through the M-th terminal groups, respectively, an m-th space switch corresponding to the m-th terminal group and having N input terminals and N output terminals for controllably establishing connection between the input and the output terminals; (e) input means connected to the intermediate terminals of the terminal groups and to the input terminals of the space switches for supplying the packets broadcast to the intermediate terminals of the m-th terminal group to the input terminals of the m-th space switch as up to N simultaneous packets in each of successive time periods; (f) N buffers connected to the respective output terminals of the m-th space switch to buffer, as buffered packets, the simultaneous packets delivered from the input terminals to the output terminals in the m-th space switch in at least one of the time periods; and (g) a selector for cyclically selecting the buffers to successively supply the m-th outgoing terminal with the buffered packets one at a time.

According to a third aspect of this invention, the above-understood packet switching arrangement comprises control means connected to the input means and to the m-th space switch for controlling the m-th space switch so that the connection be established in the m-th space switch in accordance with priorities assigned to the input terminals supplied with the up to N simultaneous packets.

It is possible to alternatively understand that a packet switching arrangement includes: (a) K incoming terminals and first through K-th outgoing terminals, where K represents a predetermined integer; (b) a greater plurality of intermediate terminals divided into first through K-th terminal families corresponding to the first through the K-th outgoing terminals, respectively, a k-th terminal family corresponding to a k-th outgoing terminal and consisting of a smaller plurality of intermediate terminals which are divided into first through M-th terminal groups, where k is variable between 1 and K, both inclusive, M representing an integer selected for each of the terminal families; (c) first through M-th internal terminals corresponding to the first through the M-th terminal groups of the k-th terminal family, respectively, an m-th internal terminal corresponding to an m-th terminal group and consisting of N internal terminals, where m is variable between 1 and M, both inclusive, N representing an integer selected for each of the terminal groups of the terminal families; (d) broadcasting means connected to the incoming terminals and to the intermediate terminals of the terminal groups of the terminal families for broadcasting packets arriving at the incoming terminals to the intermediate terminals of selected ones of the terminal groups of the terminal families according to destinations indicated by the respective packets; (e) first through M-th space switches corresponding to the first through the M-th terminal groups of the k-th terminal family, respectively, an m-th space switch corresponding to the m-th terminal group of the k-th terminal family and having N input terminals and N output terminals for controllably establishing connection between the input and the output terminals; (f) primary input means connected to the intermediate terminals of the k-th terminal family and to the input terminals of the first through the M-th space switches for supplying the packets broadcast to the intermediate terminals of the m-th terminal group of the k-th terminal family to the input terminals of the m-th space switch as up to N primary simultaneous packets in each of successive time periods; (g) N primary buffers connected to the respective output terminals of the m-th space switch to buffer, as primary buffered packets, the primary simultaneous packets delivered from the input terminals to the output terminals in the m-th space switch in at least one of the time periods; (h) a primary selector for cyclically selecting the primary buffers to successively supply the m-th internal terminal with the primary buffered packets as intermediate packets one at a time; (i) a single space switch having M input terminals and M output terminals for controllably establishing connection between the input and the output terminals of the single space switch; (j) secondary input means connected to the first through the M-th internal terminals and to the input terminals of the single space switch for supplying the intermediate packets supplied to the first through the M-th internal terminals to the input terminals of the single space switch as up to M secondary simultaneous packets in each of the time periods; (k) M secondary buffers connected to the respective output terminals of the single space switch to buffer, as secondary buffered packets, the secondary simultaneous packets delivered from the input terminals to the output terminals in the single space switch in at least one of the time periods; and (l) a secondary selector for cyclically selecting the secondary buffers to successively supply the k-th outgoing terminal with the secondary buffered packets one at a time.

According to a fourth aspect of this invention, the alternatively understood packet switching arrangement comprises: (A) primary control means connected to the primary input means and to the m-th space switch for controlling the m-th space switch so that the connection be established in the m-th space switch in accordance with primary priorities assigned to the input terminals supplied with the up to N primary simultaneous packets and (B) secondary control means connected to the secondary input means and to the single space switch for controlling the single space switch so that the connection be established in the single space switch in accordance with secondary priorities assigned to the input terminals supplied with the up to M secondary simultaneous packets.

DESCRIPTION OF THE PREFERRED EMBODIMENTS

Figure 1:
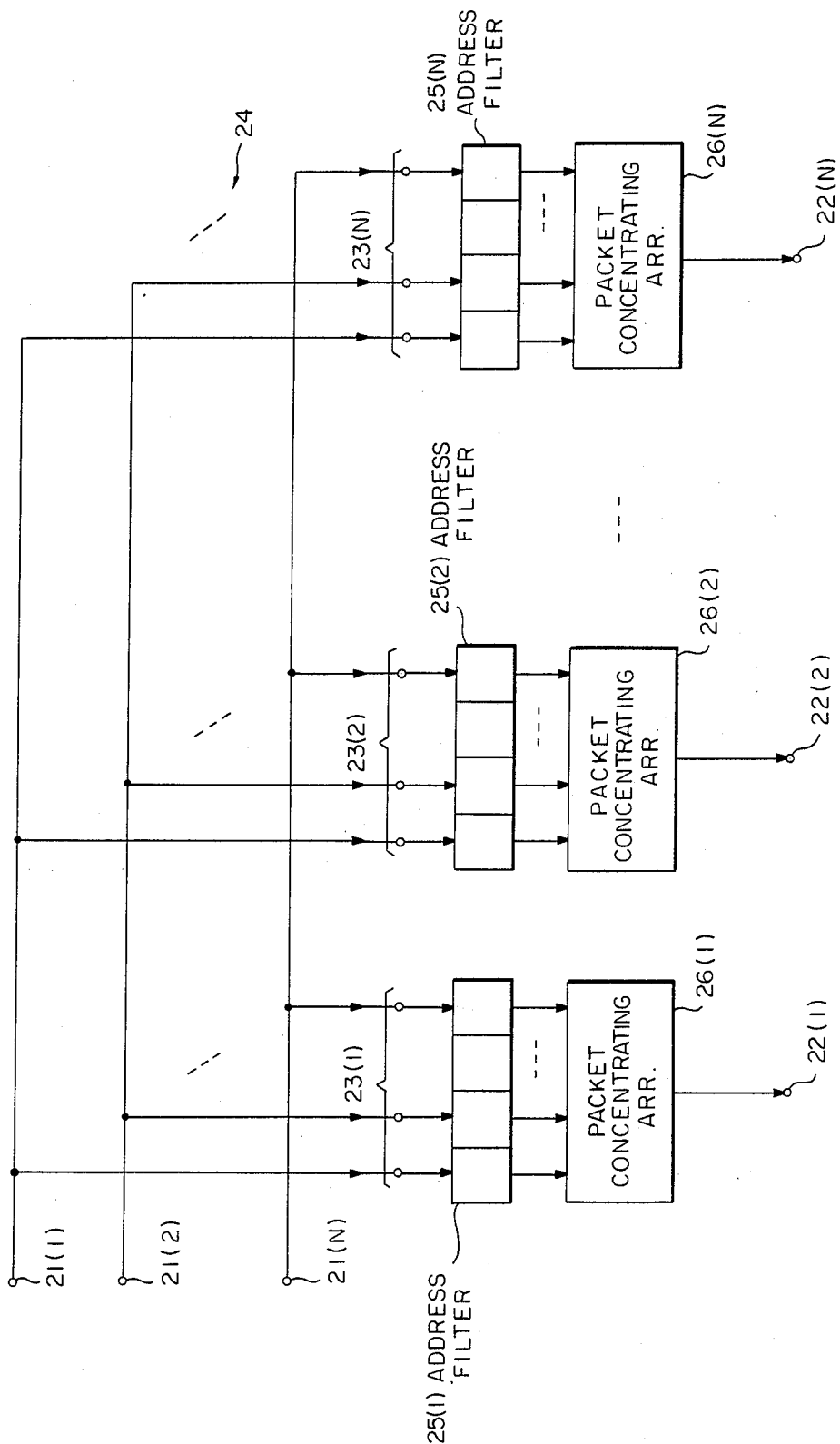
FIG. 1 is a block diagram of a general packet switching arrangement.

Referring to FIG. 1, a conventional packet switching arrangement will be described at first in order to facilitate an understanding of the instant invention. The conventional packet switching arrangement is the knockout switch revealed in the Acampora et al patent cited heretobefore. It should be noted that FIG. 1 shows a packet switching arrangement according to the present invention, too, in the manner which will be described later in the following.

The knockout switch comprises first through N-th incoming terminals 21(1), 21(2), ..., and 21(N) and first though N-th outgoing terminals 22(1), 22(2), ..., and 22(N), where N represents a predetermined integer. The incoming and the outgoing terminals are herein so named merely for convenience of the description and may or may not be connected to other central offices through communication channels. An n-th incoming terminal will be designated by 21(n), where n is variable between 1 and N, both inclusive. Depending on the circumstances, the incoming terminal or terminals will be denoted by 21 with the suffix or suffixes omitted. Such designation will be used in connection with the outgoing terminals and other circuit components which will appear as the description proceeds.

For the purpose which will presently become clear, intermediate terminals are divided or grouped into first through N-th terminal groups 23(1), 23(2), ..., and 23(N). Each terminal group consists of N intermediate terminals.

Broadcast busses 24 are connected to the incoming terminals 21 and to the intermediate terminals of the first through the N-th terminal groups 23. Arriving at the incoming terminals 21, fixed-length arriving packets of information are delivered to the intermediate terminals of the respective terminal groups 23. First through N-th address filters 25(1), 25(2), ..., and 25(N) are connected to the respective terminal groups 23. Each address filter 25 comprises N filter units for a common destination which may be indicated by one of successive arriving packets and may be understood to be indicated by the respective ones of the successive arriving packets. According to such destination indicated by the respective packets, the arriving packets are selected by the first through the N-th address filters 25. It is therefore possible to understand that a combination of the broadcast busses 24 and the address filters 25 serves as a broadcasting device for broadcasting the arriving packets to the intermediate terminals of selected ones of the terminal groups 23 according to the destinations.

First through N-th packet concentrating arrangements 26(1), 26(2), ..., and 26(N) are connected to the first through the N-th address filters 25 and the first through the N-th outgoing terminals 22. Attention will be directed to an n-th packet concentrating arrangement 22(n) which corresponds to an n-th terminal group 23(n). The n-th packet concentrating arrangement 23 is interposed between the n-th address filter 25 and the n-th outgoing terminal 22. To the n-th outgoing terminal 22, the n-th packet concentrating arrangement 26 concentrates the arriving packets which are selected by the n-th address filter 25 according to a destination directing to the n-th outgoing terminal 22.

Figure 2:
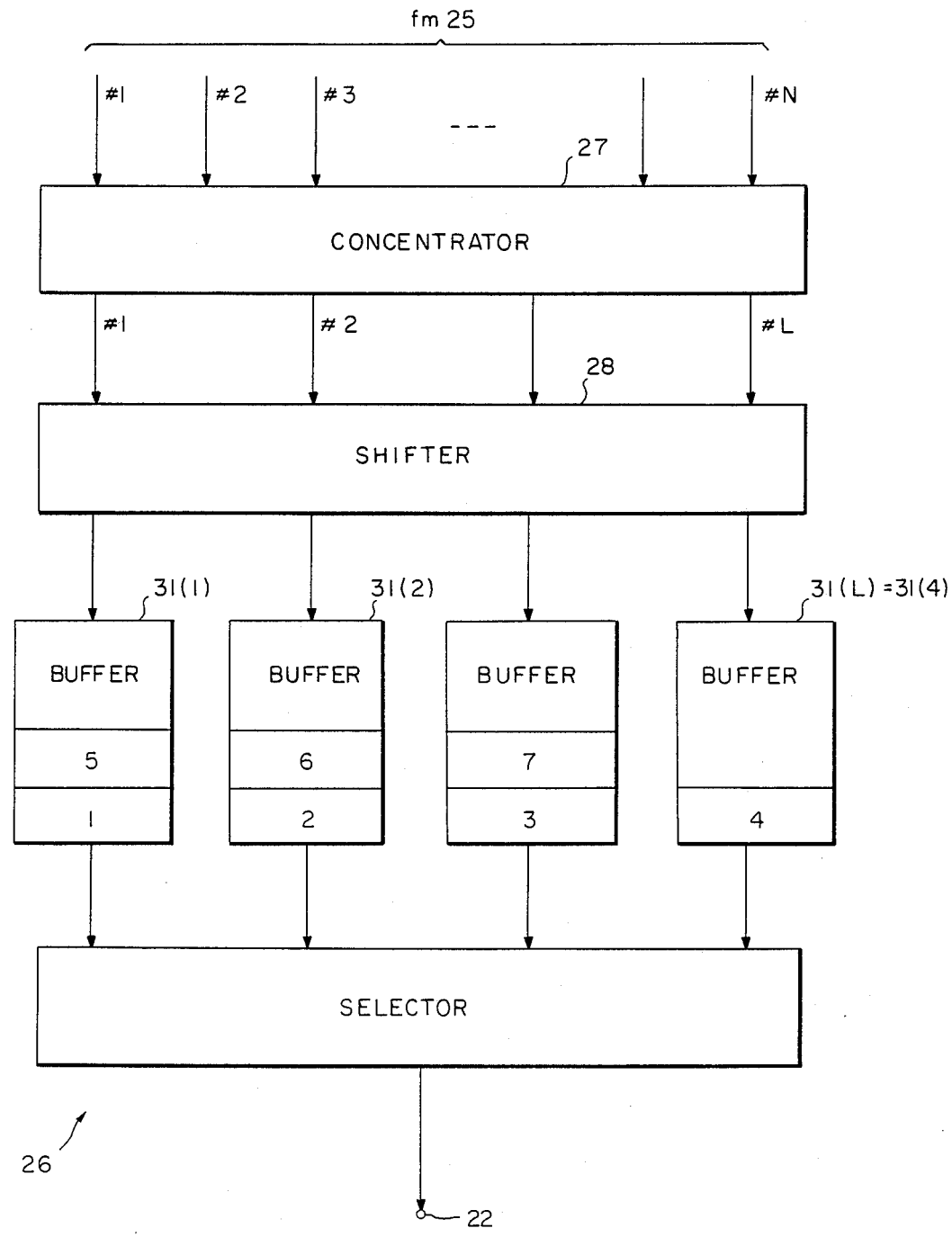
FIG. 2 is a block diagram of a conventional packet concentrating arrangement.

Referring to FIG. 2, each packet concentrating arrangement 26 comprises a concentrator 27 having N input ports and L output ports where L is not greater than the predetermined integer N. The input ports are connected to the respective filter units of the address filter 25. A shifter 28 has L input ports and L output ports. The input ports of the shifter 28 are connected to the respective output ports of the concentrator 27.

The output ports of the concentrator 27 will be called first through L-th output ports from the left end of the figure towards the right end. Up to N arriving packets are simultaneously delivered from the address filter 25 to the concentrator 27 in each of successive time periods as simultaneous packets. The concentrator 27 delivers the simultaneous packets to the first through the L-th output ports. On so delivering the simultaneous packets, the concentrator 27 uses the first output port at first and successively towards the L-th output port. When the simultaneous packets are greater in number than L, only L simultaneous packets are supplied to the shifter 28. Other simultaneous packets are discarded or lost.

Each packet concentrating arrangement 26 further comprises first through L-th buffers 31(1), 31(2), ..., 31(L) connected to the respective output ports of the shifter 28. Each buffer 31 is a first-in first-out (FIFO) buffer. The simultaneous packets are delivered from the address filter 25 in the successive time periods and are buffered as buffered packets in the manner which will shortly be described. When the buffers are four in number, seven simultaneous packets 1 through 7 are stored in the buffers 31 in the manner exemplified. A selector 32 cyclically selects the buffers 31 to successively supply the buffered packets to the outgoing terminal 22 one at a time.

Figure 3:
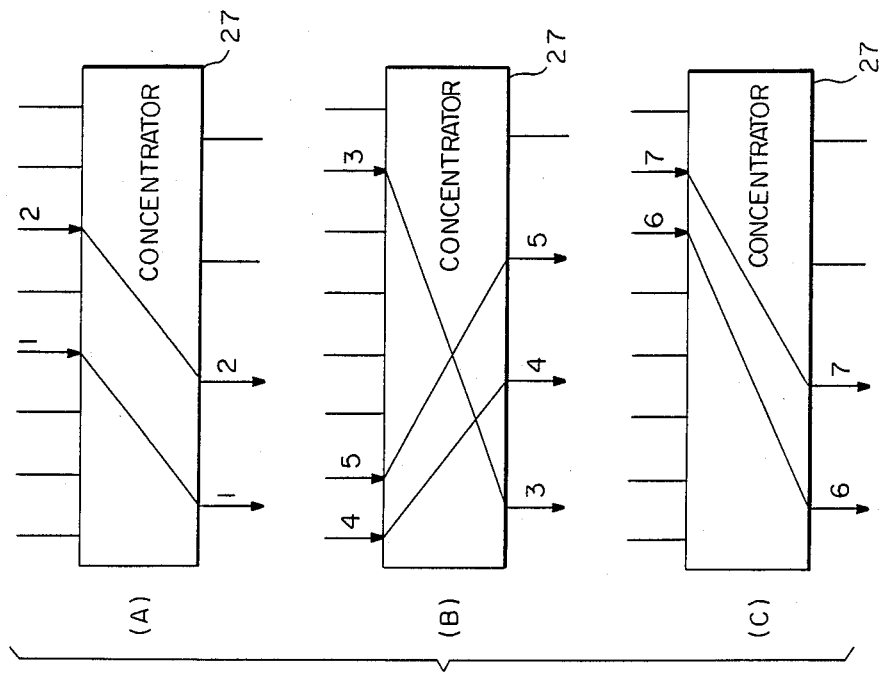
FIGS. 3 (A) through (C) show a conventional concentrator which is used in the packet concentrating arrangement depicted in FIG. 2.

Turning to FIGS. 3 (A) through (C), it will be assumed that two simultaneous packets 1 and 2, three simultaneous packets 3, 4, and 5, and two simultaneous packets 6 and 7 are supplied to some of the input ports of the concentrator 27 at first through third successive time periods. The simultaneous packets 1 and 2 are delivered to the first and the second output ports. The simultaneous packets 3 through 5 are delivered to the first through the third output ports. The simultaneous packets 6 and 7 are delivered to the first and the second output ports.

Figure 4:
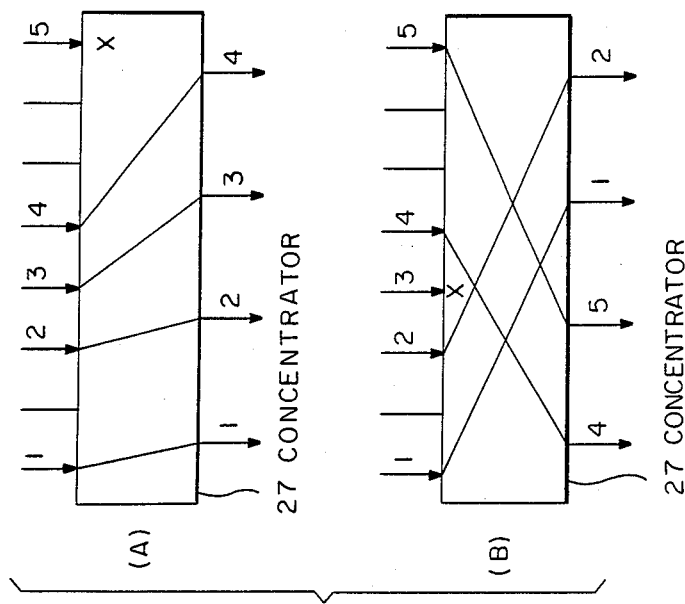
FIGS. 4 (A) and (B) show two modes of operation of the concentrator depicted in FIGS. 3 (A) through (C)

Further turning to FIGS. 4 (A) and (B), it will now be presumed that the concentrator 27 has only four output ports and that five simultaneous packets 1 through 5 are supplied in one of the time periods to some of its input ports. In FIG. 4 (A), the concentrator 27 supplies the output ports with the simultaneous packet supplied to left ones of the input ports. Being supplied to a right input port, the packet 5 is discarded. When the concentrator 27 is operable in this manner, the simultaneous packets are more liably discarded when supplied to right ones of the input ports. In FIG. 4 (B), the simultaneous packets are discarded with a uniform or equalized probability of discard. In other words, the concentrator 27 has a randomized relationship between the input and the output parts.

Figure 5:
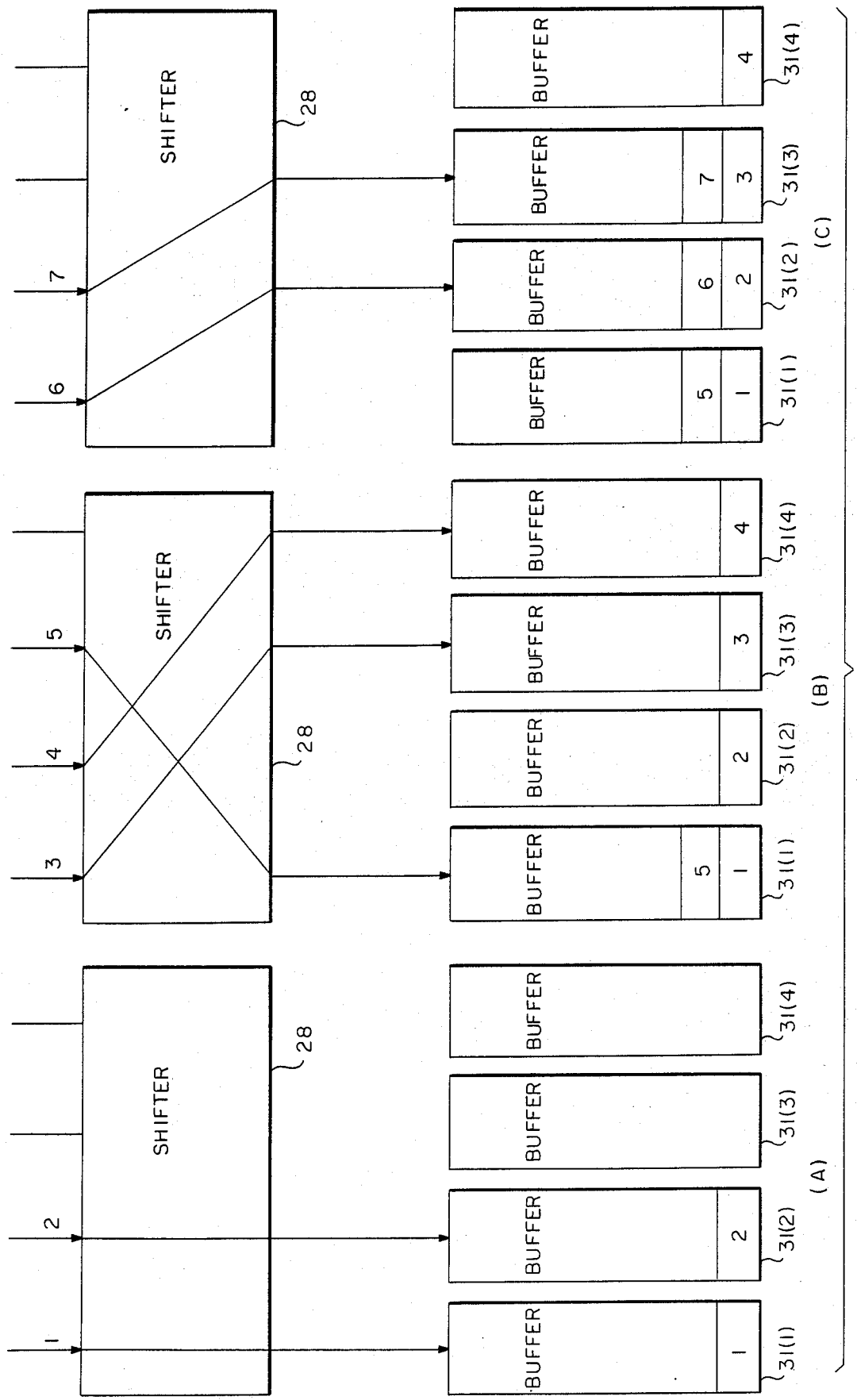
FIGS. 5 (A) through (C) shows a conventional combination of a shifter and buffers which are used in the packet concentrating arrangement illustrated in FIG. 2.

Still further turning to FIGS. 5 (A) through (C), the shifter 28 is supplied with the simultaneous packets 1 and 2, 3 through 5, and 6 and 7 described in connection with FIGS. 3 (A) through (C). It is again presumed that the buffers 31 are the first through the fourth buffers 31(1) to 31(4) and that the buffers 31 are empty immediately before the first time period of the successive time periods. In the first time period, the shifter 28 stores the simultaneous packets 1 and 2 in the first and the second buffers 31(1) and 31(2). In the second time period, the shifter 28 stores the simultaneous packets 3 through 5 in the third and the fourth buffers 31(3) and 31(4) and in the first buffer 31(1). In the third time period, the shifter 28 stores the simultaneous packets 6 and 7 in the second and the third buffers 31(2) and 31(3).

Reviewing FIGS. 1 through 5, the knockout switch and each packet concentrating arrangement 26 are operable with a high buffer efficiency and at a high speed. In each packet concentrating arrangement 26, the concentrator 27 and the shifter 28 are used as a two-stage space switch. Due to use of the space switches in two stages, the knockout switch and each packet concentrating arrangement 26 are bulky and difficult to control. Usually, the output ports of the concentrator 27 are less in number than its input ports. As a result, some of the simultaneous packets are inevitably discarded or lost while being dealt with by the concentrator 27.

Figure 7:
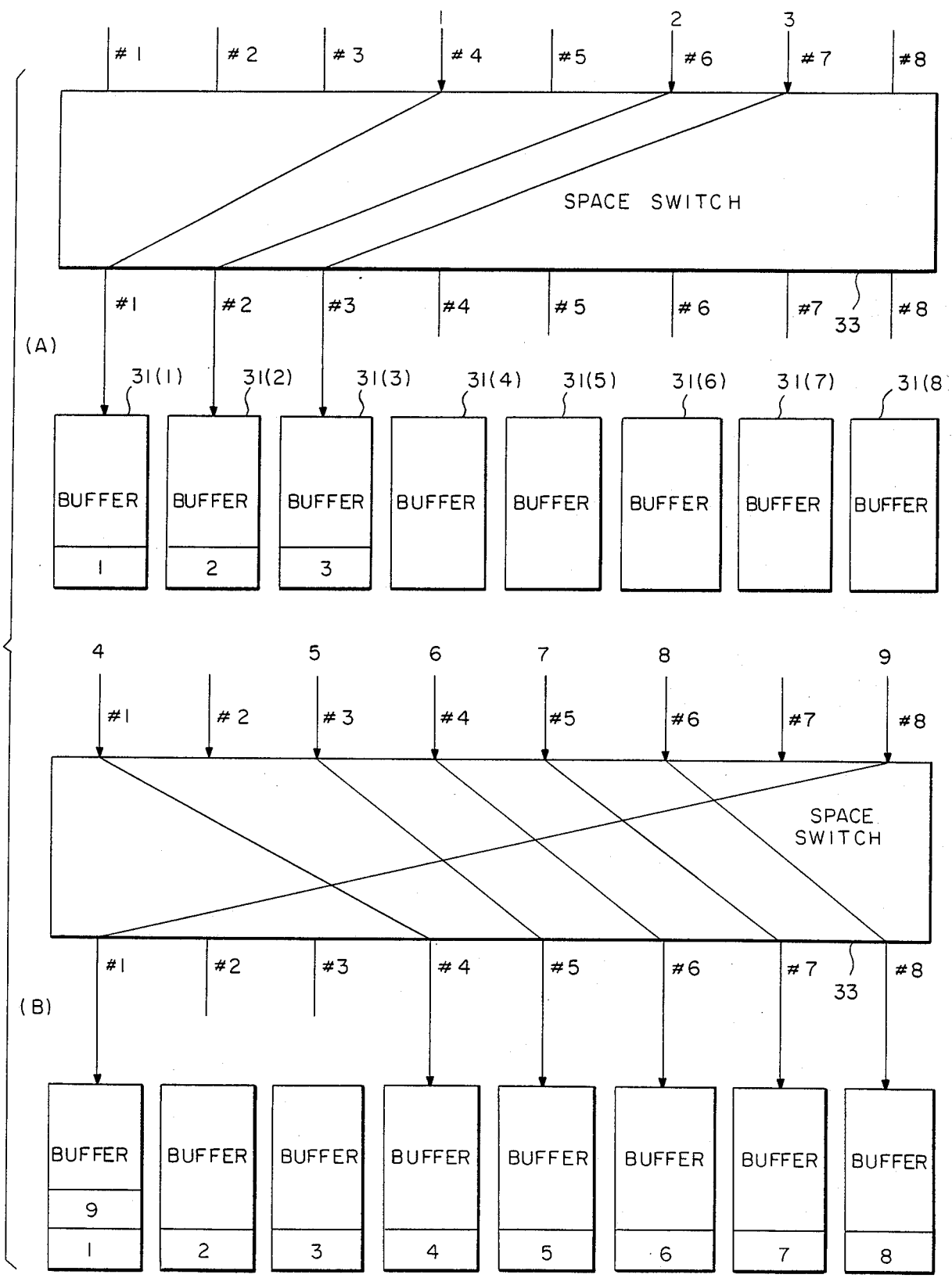
FIGS. 7 (A) and (B) show a space switch which is used in the packet concentrating arrangement depicted in FIG. 6.
Figure 8:
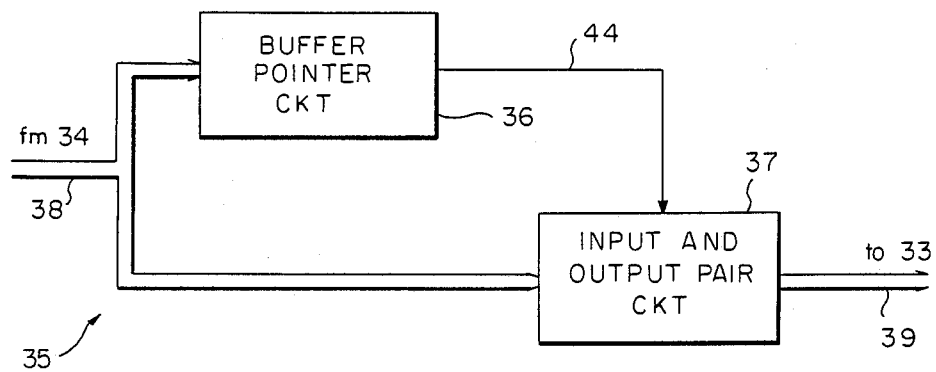
FIG. 8 is a block diagram of a controller for use in the packet concentrating arrangement depicted in FIG. 6.

In such a conventional packet concentrating arrangement, the concentrator 27 comprises binary switches in a plurality of stages in the manner depicted in FIG. 7 of the Acampora et al patent and in FIG. 8 of the Yeh et al article. The binary switches are complicated in structure as compared with the gate circuits of a crossbar switch and are complicatedly interconnected. This results in difficulties in design, manufacture, use, and maintenance of the knockout switch and the conventional packet concentrating arrangement. It is desirable in connection with discard of some of the simultaneous packets to randomize the relationship between the input and the output ports of the concentrator 27 in the manner described hereinabove with reference to FIG. 5 (B) by introducing random control of the binary switches. This additionally complicates the concentrator 27.

It is a recent trend to use a high-speed packet switching arrangement in dealing with all sorts of communication services in which conventional communications switching arrangements are used in dealing with synchronous communications, such as speech signals and moving picture signals. On dealing with synchorous communication services and particularly in a concentrating arrangement for subscriber lines, simultaneous arrival of a plurality of packets is liably repeated once the simultaneous arrival takes place. The repeated simultaneous arrival results in repeated discard of some of the simultaneous packets. The knockout switch is therefore disadvantageous in such a field of communication services. A like problem is inevitable also in an asynchronous communication service when an offset occurs in the traffic during lapse of time.

Figure 6:
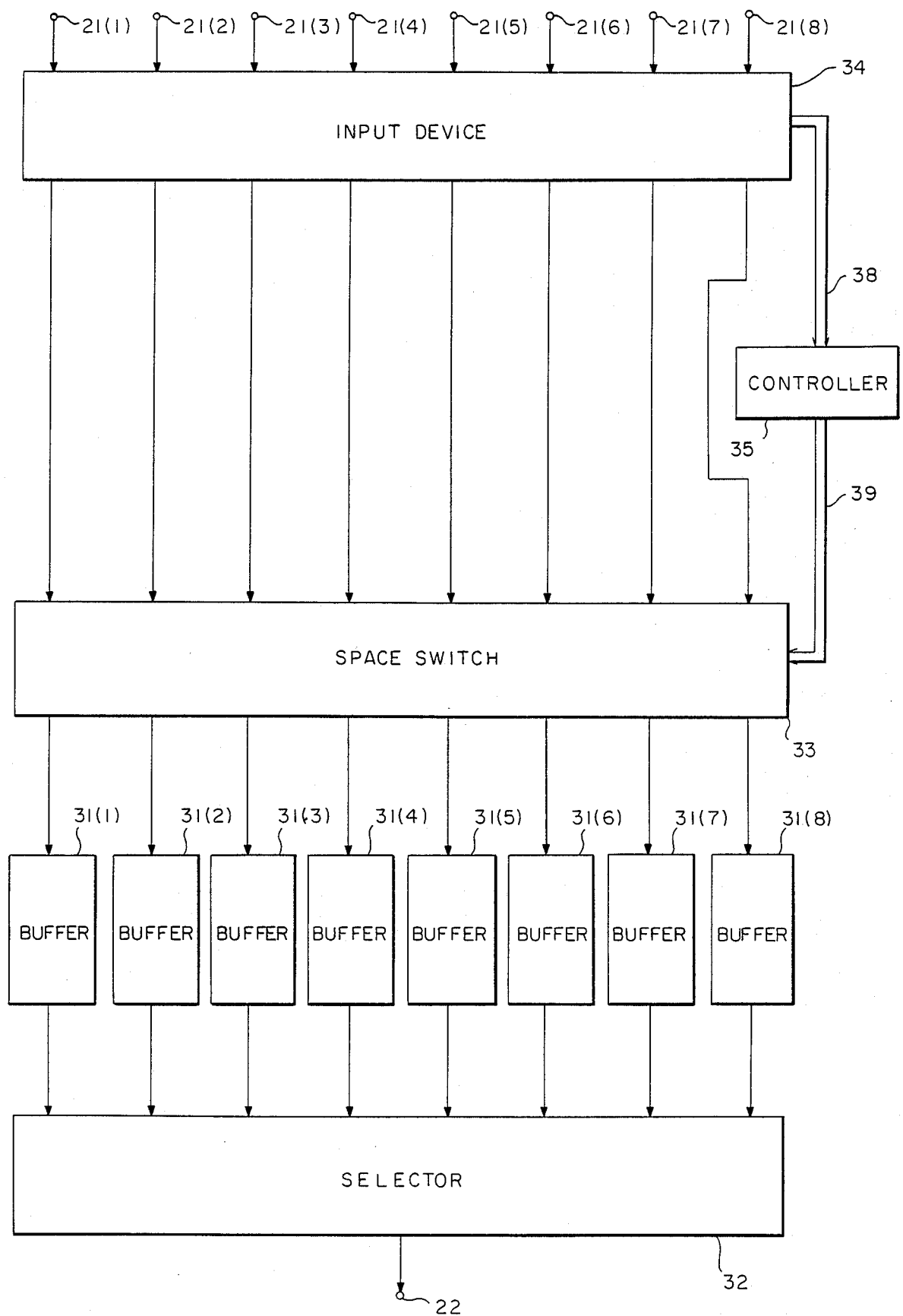
FIG. 6 is a block diagram of a packet concentrating arrangement according to a first embodiment of this invention.

Referring now to FIG. 6, the description will proceed to a packet concentrating arrangement according to a first embodiment of the present invention. Similar parts are designated by like reference numerals.

It will be surmised merely for simplicity of the description that the packet concentrating arrangement is for concentrating first to eighth incoming terminals 21(1) through 21(8) to a single outgoing terminal 22. In other words, the predetermined integer N is equal to eight. Arriving fixed-length packets of information are received at the incoming terminals 21. First through eighth buffers 31(1) to 31(8) are cyclically selected by a selector 32 connected to the outgoing terminal 22.

A space switch 33 has eight input terminals and eight output terminals. The buffers 31 are connected to the respective output terminals. An input device 34 is connected to the incoming terminals 21 and to the input terminals. Acting as a sensor, the input device 34 senses those of the incoming terminals 21 at which the arriving packets arrive and at which no arriving packets arrive. The input device 34 informs a controller 35 of arrival and no arrival of the arriving packets by binary one and zero bits. Furthermore, the input device 34 acts as a delay circuit for giving a delay to each arriving packet in the manner which will become clear as the description proceeds. Thereafter, the input device 34 supplies the arriving packets to the input terminals as up to eight simultaneous packets in each of successive time periods.

The space switch 33 comprises cross points (not shown) between the input and the output terminals. In the manner which will presently be described, the controller 35 controls the cross points to deliver the simultaneous packets from the input terminals to the output terminals. The controller 35 therefore serves as a controlling device connected to the space switch 33 and to the input device 34 to control the space switch 33 so that connection be established for the simultaneous packets between the input and the output terminals. The arriving packets should therefore be delayed in the input device 34 until establishment of the connection for each simultaneous packet.

As will be described more in detail in the following, the connection is established in the space switch 33 so that the simultaneous packets be delivered in lapse of the time periods cyclically to the first through the eighth buffers 31. As buffered packets, the simultaneous packets are buffered in the buffers 31 and then cyclically supplied by the selector 32 to the outgoing terminal 22 one at a time.

Turning to FIGS. 7 (A) and (B), the space switch 33 is substantially synchronously supplied with three simultaneous packets 1 through 3 at a first time period of the successive time periods and with six simultaneous packets 4 through 9 at a second time period. It is assumed that the buffers 31 are empty immediately before the first time period. The space switch 33 is controlled to store the three simultaneous packets 1 through 3 in the first through the third buffers 31(1) to 31(3) and the six simultaneous packets 4 through 9 in the fourth through the eighth buffers 31(4) to 31(8) and in the first buffer 31(1). Under the circumstances, the connection may be established in any manner between the input terminals supplied with no simultaneous packets and the output terminals through which no simultaneous packets are delivered to the buffers 31.

In this manner, the buffers 31 are used as if the buffers 31 are equivalent to a single first-in first-out buffer. In other words, the buffered packets are delivered to the outgoing terminal 22 in a first-in first-out fashion. Inasmuch as the buffers 31 are equal in number to the incoming terminals 21, no packets are discarded or lost in the space switch 33. It should furthermore be noted that the space switch 33 is used only in a single stage. Incidentally, each buffered packet is read out of the buffers 31 according to the fixed length.

Referring to FIG. 8, the controller 35 may comprise a buffer pointer circuit 36 and an input and output pair or pairing circuit 37. Through eight one-bit lines 38, the buffer pointer circuit 36 is connected to the input device 34. The input and output pair circuit 37 is connected to the input device 34 through the eight one-bit lines 38 and to the buffer pointer circuit 36 through a single three-bit line. Through eight three-bit lines 39, the input and output pair circuit 37 is connected to the space switch 33.

The eight one-bit lines 38 are for collectively supplying the buffer pointer circuit 36 with an eight-bit terminal number signal indicative of a terminal number which represents how many input terminals of the space switch 33 are supplied with the up to eight simultaneous packets in each of the successive time periods. In the manner depicted in FIGS. 7 (A) and (B), the input terminals will be given serial input numbers, respectively. Serial output numbers will be given to the respective output terminals. The output numbers are in one-to-one correspondence to the input numbers and are cyclically used on establishing the connection of the output terminals to the input terminals in the successive time periods.

Figure 9:
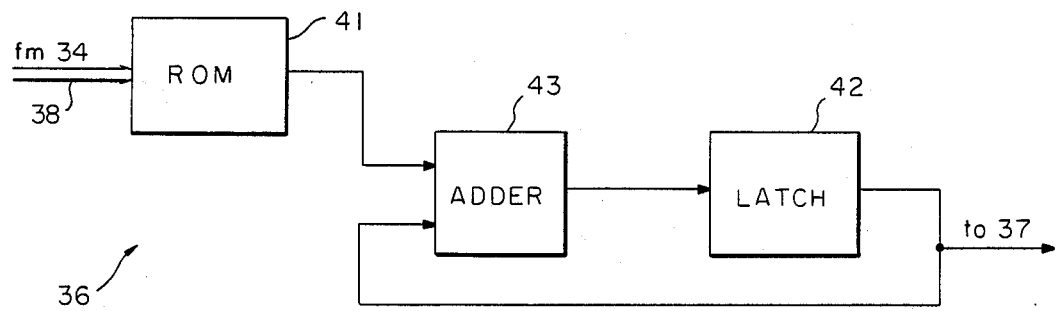
FIG. 9 is a block diagram of a buffer pointer circuit for use in the controller illustrated in FIG. 8.

Turning to FIG. 9, the buffer pointer circuit 36 comprises an output number read-only memory (ROM) 41 connected to the eight one-bit lines 38 and having a plurality of memory addresses which are accessible by the terminal number signal. From the memory address corresponding to the terminal number, the read-only memory 41 produces a four-bit particular number signal indicative of one of the output numbers as a particular number that is determined by the terminal number in one of the successive time periods.

By way of example, FIG. 7 (A) will be reviewed. At the first time period, the terminal number signal consists of three binary zero bits, one binary one bit, one binary zero bit, two binary one bits, and one binary zero bit to indicate supply of the three simultaneous packets to the space switch 33. In this event, the particular number is equal to three. This indicates that the simultaneous packets are delivered to the output terminals in the first time period up to the output terminal given the output number of three. For the particular number signal, four bits are used because the particular number may be equal to one of zero through eight.

In FIG. 9, a latch 42 is connected to the output number read-only memory 41 through a single modulo-eight adder 43 to latch the particular number signal as a latched signal. The adder 43 is supplied with the particular number signal and the latched signal. At the second time period depicted in FIG. 7 (B), the particular number is equal to six. The adder 43 calculates a single sum of these particular numbers, namely, three and six modulo eight.

As one of the particular numbers, three is indicated by the latched signal, namely, by the particular number signal produced in the first time period or the above-mentioned one of the time periods by the output number read-only memory 41. As the other of the particular numbers, six is indicated by the particular number signal which is produced afresh in the second time period, namely, in a time period succeeding the first time period.

As an initial particular number, zero is set in the latch 42 when the buffers 31 are all empty. It is now understood that the latch 42 supplies the single three-bit line, indicated at 44, with the latched signal as a three-bit buffer pointer signal indicative of the output number given to one of the output terminals of the space switch 33 up to which the simultaneous packets are delivered from the input terminals in each of the time periods. The buffer pointer signal is so named because the output number in question indicates one of the buffers 31 up to which the buffered packets are buffered. The buffer pointer signal thereby indicates one of the buffers 31 from which storage of the simultaneous packets should start in a next following time period.

Figure 10:
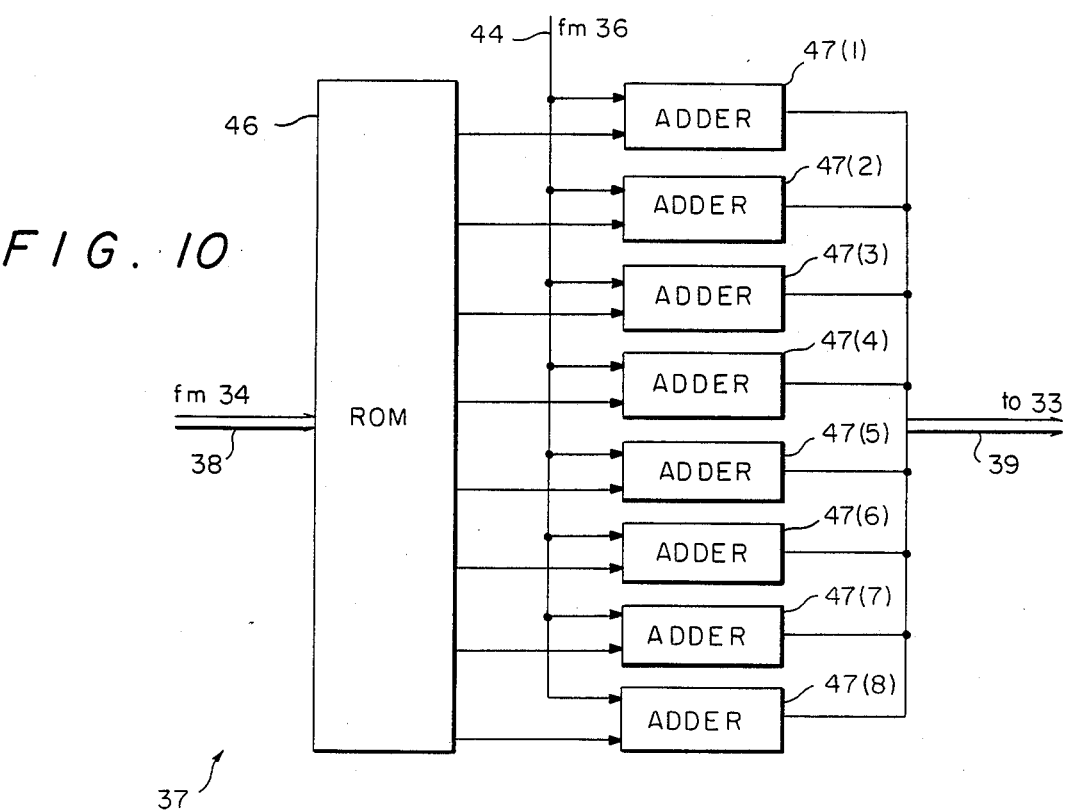
FIG. 10 is a block diagram of an input and output pair circuit for use in the controller shown in FIG. 8.

Further turning to FIG. 10, the input and output pair circuit 37 comprises a priority read-only memory 46 connected to the eight one-bit lines 38 and having a plurality of memory addresses which are accessed by the terminal number signal and each of which consists of eight memory cells. Such memory addresses may alternatively be called memory sectors. Eight three-bit data are preliminarily stored in each memory sector. By serial priority numbers, the eight three-bit data are indicative of priorities or degrees of priority which should be assigned to the input terminals supplied with the up to eight simultaneous packets in each of the successive time periods. The priority numbers increase with a decrease in the priorities. The priority read-only memory 46 produces a priority signal which consists in each of the time periods of eight three-bit signals indicative of up to eight serial priority numbers.

For example, let six simultaneous packets be supplied to the input terminals of the space switch 33 as exemplified in FIG. 7 (B). The input terminals under consideration are given the input numbers of 1, 3, 4, 5, 6, and 8. The priority numbers of 1 through 6 are assigned to the input terminals given the input numbers 1, 3 through 6, and 8, respectively. It should be noted in connection with this example that the serial priority numbers are assigned in accordance with the input numbers to the input terminals supplied with the up to eight simultaneous packets in each of the time periods. As the priority numbers, seven and eight may be assigned to the input terminals supplied with no simultaneous packets.

In FIG. 10, the eight three-bit signals are delivered from the priority read-only memory 46 to eight modulo-eight adders 47(1), 47(2), . . . and 47(8). Through the single three-bit line 44, the buffer pointer signal is delivered to all adders 47. Calculating eight sums modulo eight, the adders 47 delivers eight three-bit sum signals to the eight three-bit lines 39 collectively as an input and output pair signal indicative of the output numbers of those of the output terminals of the space switch 33 which should be connected to the input terminals assigned with the priorities.

Figures 11, 12:
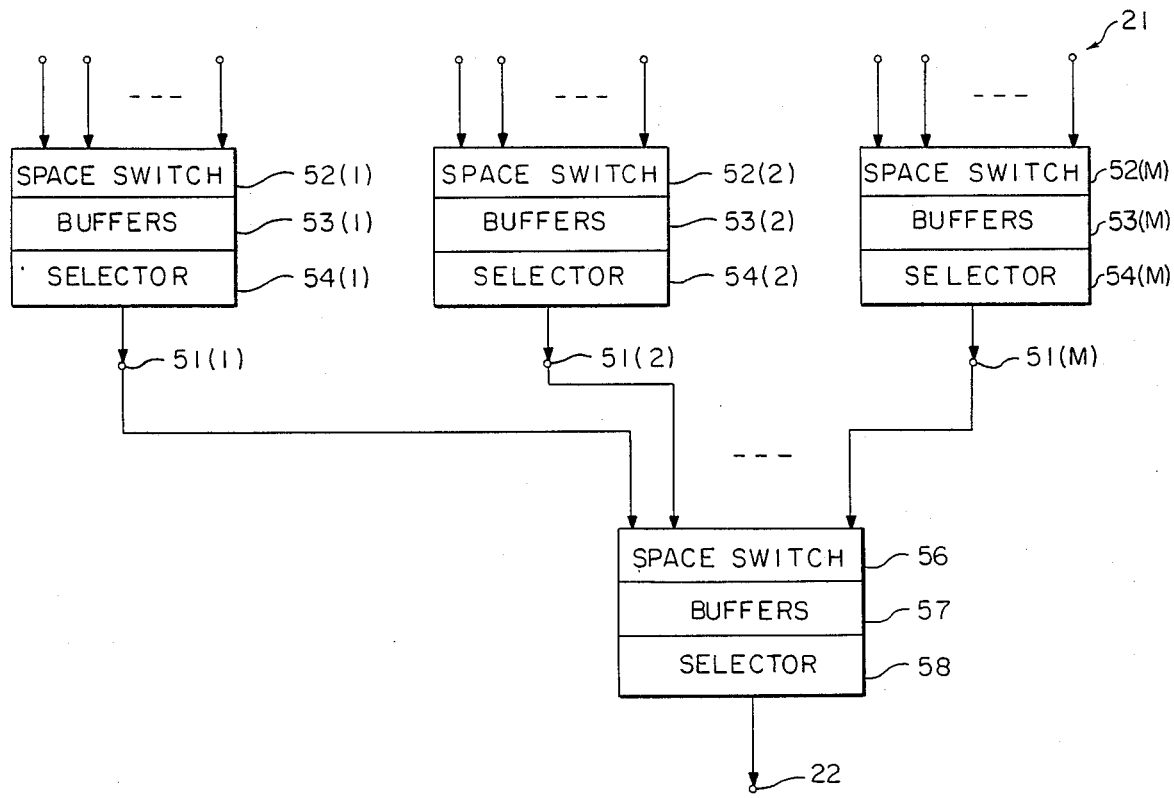
FIG. 11 is a diagram for use in describing manners of use of the controller depicted in FIG. 8.
FIG. 12 is a block diagram of a packet concentrating arrangement according to a second embodiment of this invention.

Referring to FIG. 11, the simultaneous packets are supplied as depicted in FIG. 7 (B) to the input terminals given the input numbers 1, 3 through 6, and 8 among the input terminals given the input numbers 1 through 8 listed in the leftmost column. The input device 34 prodoces the eight-bit terminal number signal consisting of one binary one bit, one binary zero bit, four binary one bits, one binary zero bit, and one binary one bit listed in the second column from the left end. When the priorities are assigned in the manner described above to the input terminals supplied with the simultaneous packets, the priority numbers become as listed in a column labelled A. It is understood that higher priorities are given to less numbered input terminals which are given less input numbers.

It should be noted in this connection that the buffers 31 have a limited memory capacity for the buffered packets. The memory capacity is determined in the known manner in consideration of the number of packets which arrive as the arriving packets at the incoming terminals 21 per unit time. The buffers 31 are therefore subjected to overflow if an excessive number of packets arrive at the incoming terminals 21 at a particular time instant. Some of the arriving packets must be discarded when the overflow takes place. According to the column A, the connection is established more readily for the less numbered input terminals. Discard of the simultaneous packets less frequently appears in connection with the less numbered input terminals.

In another column labelled B, the priorities are randomly assigned to the input terminals supplied with the up to eight simultaneous packets. This is readily achieved so preliminarily storing the priority numbers in the priority read-only memory 46. Although random, it is possible to understand that the priorities are assigned in accordance with the input numbers to the input terminals supplied with the simultaneous packets in each of the successive time periods.

Reviewing FIGS. 8 through 11, it is now understood that the controller 35 controls the space switch 33 in accordance with the priorities assigned to the input terminals supplied with the up to eight simultaneous packets. A little more in detail, the controller 35 assigns the serial priority numbers in accordance with the input numbers to the input terminals supplied with the simultaneous packets in one of the successive time periods and controls the space switch 33 so that the connection be established between the input terminals assigned with the priority numbers and the output terminals of the output numbers selected in compliance with the sums modulo eight of the priority numbers and a maximum modulo eight, namely, the particular number, of the output numbers which are given to the output terminals used in the connection in a time period preceding the above-mentioned one of the time periods. Produced by the input and output pair circuit 37 in the example illustrated with reference to FIG. 10, the sums give the output numbers for the output terminals which should be used in the connection to the input terminals assigned with the priority numbers.

It is additionally possible to understand that the input and output pair circuit 37 keeps the priority numbers versus the terminal numbers which are indicated by the terminal number signal in the successive time periods. Incidentally, the input and output pair circuit 37 may readily be modified to indicate the input numbers of the input terminals which are supplied with the up to eight simultaneous packets and should be connected to the output terminals having the output number determined with reference to the particular number.

Referring now to FIG. 12, the description will proceed to a packet concentrating arrangement according to a second embodiment of this invention. A plurality of incoming terminals are designated by the reference numeral 21 and are divided or grouped into first through M-th terminal groups, where M represents a predetermined integer. An m-th terminal group consists of N incoming terminals, where m is variable between 1 and M, both inclusive, N representing an integer which is selected for each of the terminal groups. An outgoing terminal is indicated at 22.

First through M-th internal terminals 51(1), 51(2), . . . , and 51(M) are in one-to-one correspondence to the first through the M-th terminal groups. An m-th internal terminal 51(m) corresponds to the m-th terminal group.

First through M-th spaces switches 52(1), 52(2), . . . , and 52(M) are in one-to-one correspondence to the first through the M-th terminal groups. An m-th space switch 52(m) corresponds to the m-th terminal group, has N input terminals and N output terminals, and is for controllably establishing connection between the input and the output terminals.

In the manner described in conjunction with FIG. 6, first through M-th input devices are connected to the incoming terminals 21 of the first through the M-th terminal groups and to the input terminals of the first through the M-th space switches 52. Such input devices will be called primary input devices. An m-th primary input device is for supplying the packets arriving at the incoming terminals 21 of the m-th terminal group to the input terminals of the m-th space switch 52 as up to N simultaneous packets in each of the successive time periods. The simultaneous packets will be called primary simultaneous packets.

First through M-th buffer groups 53(1), 53(2), . . . , and 53(M) are connected to the first through the M-th space switches 52, respectively. Each buffer group 53 consists of a plurality of buffers 31 described in connection with FIG. 6. Such buffers will be termed primary buffers. As a consequence, N primary buffers of an m-th buffer group 53 are connected to the respective output terminals of the m-th space switch 52 to buffer, as primary buffered packets, the primary simultaneous packets which are delivered from the input terminals of the m-th space switch 52 to its output terminals in the successive time periods.

First through M-th selectors 54(1), 54(2), . . . , and 54(M) are used as primary selectors 54 between the first through the M-th buffer groups 53 and the first through the M-th internal terminals 51. More particularly, an m-th primary selector 54(m) is used between the primary buffers of the m-th buffer group 53 and the m-th internal terminal 51. The m-th primary selector 54 is for cyclically selecting the primary buffers of the m-th buffer group 53 to successively supply the m-th internal terminal 51 with the primary buffered packets as intermediate packets one at a time.

A single space switch 56 has M input terminals and M output terminals and is for controllably establishing connection between the input and the output terminals thereof. Again as in FIG. 6, a secondary input device is connected to the first through the M-th internal terminals 51 and to the input terminals of the single space switch 56. The secondary input device is for supplying the input terminals of the single space switch 56 with the intermediate packets supplied to the first through the M-th internal terminals 51. Such intermediate packets are supplied to the input terminals of the single space switch 56 as up to M secondary simultaneous packets in each of the successive time periods.

M secondary buffers are collectively shown at 57 and are connected to the respective output terminals of the single space switch 56 to buffer, as secondary buffered packets, the secondary simultaneous packets which are delivered from the input terminals of the single space switch 56 to its output terminals in the successive time periods. A secondary selector 58 is for cyclically selecting the secondary buffers 57 to successively supply the outgoing terminal 22 with the secondary buffered packets one at a time.

It will be readily understood from FIGS. 6 through 11 that a primary controller is connected to the primary input device and to the m-th space switch 52 to control the m-th space switch 52 so that the connection be established in the m-th space switch 52 in accordance with primary priorities assigned to the input terminals supplied with the up to N primary simultaneous packets. Similarly, a secondary controller is connected to the secondary input device and to the single space switch 56 to control the single space switch 56 so that the connection be established in the single space switch 56 in accordance with secondary priorities assigned to the input terminals supplied with the up to M simultaneous packets. Incidentally, it is desirable in general for a higher buffer efficiency that M should be greater than N.

Again referring to FIGS. 1 and 6, the predetermined integer will be denoted by M rather than by N. According to a third embodiment of this invention, a packet switching arrangement comprises M incoming terminals and first through M-th outgoing terminals which are depicted in FIG. 1 at 22. It will now be readily understood that the packet switching arrangement has a structure set forth heretobefore in connection with the third aspect of this invention.

Referring to FIGS. 1, 6, and 12 once again, the predetermined integer will be denoted by K. According to a fourth embodiment of this invention, a packet switching arrangement has a structure set forth hereinabove in conjunction with the fourth aspect of this invention.

While this invention has thus far been described in specific conjunction with a few preferred embodiments thereof, it will now be readily possible for one skilled in the art to carry this invention into effect in various other manners. For example, the primary input device may be used in FIG. 12 in common to the first through the M-th space switches 52. Incidentally, it should be noted that each of the space switch 33 and the space switches 52 and 56 is implemented by a simple crossbar switch. According to this invention, each of the packet concentrating and the packet switching arrangements is operable at a high speed of 100 megabits per second or higher.

What is claimed is:

1. A packet concentrating arrangement including:
   an outgoing terminal;
   N incoming terminals, where N represents a predetermined integer;
   a space switch having N input terminals and N output terminals for controllably establishing connection between said input and said output terminals;
   input means connected to said incoming terminals and to said input terminals for supplying packets arriving at said incoming terminals to said input terminals as up to N simultaneous packets in each of successive time periods;
   N buffers connected to the respective output terminals to buffer, as buffered packets, the simultaneous packets delivered from said input terminals to said output terminals in said space switch in at least one of said time periods; and
   a selector for cyclically selecting said buffers to seccessively supply said outgoing terminal with said buffered packets one at a time;
   wherein the improvement comprises control means connected to said input means and to said space switch for controlling said space switch so that the connection be established in said space switch in accordance with priorities assigned to the input terminals supplied with said up to N simultaneous packets.

2. A packet concentrating arrangement as claimed in claim 1, said N input terminals being given serial input numbers, respectively, said N output terminals being given serial output numbers, respectively, said output numbers corresponding to the respective input numbers and being cyclically used on establishing the connection in said time periods, wherein said control means assigns serial priority numbers in accordance with said input numbers to the input terminals supplied with the simultaneous packets in one of said time periods, said priority numbers increasing with a decrease in said priorities, said control means controlling said space switch so that the connection be established between the input terminals assigned with said priority numbers and the output terminals of the output numbers selected in compliance with sums modulo N of said priority numbers and a modulo-N maximum of the output numbers which are given to the output terminals used in the connection in a time period preceding said one of the time periods.

3. A packet concentrating arrangement as claimed in claim 2, wherein:

said input means produces a terminal number signal indicative of a terminal number which represents how many input terminals are supplied with said up to N simultaneous packets;

said control means comprising:

a buffer pointer circuit connected to said input means for producing a buffer pointer signal indicative of said maximum in response to said terminal number signal; and an input and output pair circuit connected to said input means and to said buffer pointer circuit and keeping said priority numbers versus the terminal numbers indicated by said terminal number signal in said time periods, said input and output pair circuit producing an input and output pair signal indicative of said sums.

4. A packet concentrating arrangement as claimed in claim 3, wherein:

said buffer pointer circuit comprises:

an output number read-only memory connected to said input means and having a plurality of memory addresses accessed by said terminal number signal to produce a particular number signal indicative of one of said output numbers as a particular number that is determined by the terminal number in one of said time periods;

a single modulo-N adder connected to said output number read-only memory and supplied with an adder input signal representative of an additive number for calculating a single sum of said particular number and said additive number modulo N to produce a single sum signal representative of said single sum; and a latch connected to said single adder for latching said single sum signal as a latched signal to supply said latched signal to said single adder as said adder input signal and to produce said latched signal, in a time period succeeding said one of the time periods, as said buffer pointer signal;

said input and output pair circuit comprising:

a priority read-only memory connected to said input means and to said latch and having a plurality of memory sectors accessed by said terminal number signal to produce up to N signals indicative of the output numbers determined by the priority numbers which are assigned to the input terminals supplied with the simultaneous packets in the time period succeeding said one of the time periods; and N modulo-N adders connected to said latch and to said priority read-only memory for calculating up to N modulo-N sums of said maximum and the output numbers indicated by said up to N signals, said input and output pair circuit thereby making said input and output pair signal indicate said up to N sums.

5. A packet concentrating arrangement including:

an outgoing terminal;

a plurality of incoming terminals divided into first through M-th terminal groups, an m-th terminal group consisting of N incoming terminals, where M represents a predetermined integer, m being variable between 1 and M, both inslusive, N representing an integer selected for each of said terminal groups;

first through M-th internal terminals corresponding to said first through said M-th terminal groups, respectively, an m-th internal terminal corresponding to said m-th terminal group;

first through M-th space switches corresponding to said first through said M-th terminal groups, respectively, an m-th space switch corresponding to said m-th terminal group and having N input terminals and N output terminals for controllably establishing connection between said input and said output terminals;

primary input means connected to said plurality of incoming terminals and to the input terminals of said space switches for supplying packets arriving at the incoming terminals of said m-th terminal group to the input terminals of said m-th space switch as up to N primary simultaneous packets in each of successive time periods;

N primary buffers connected to the respective output terminals of said m-th space switch to buffer, as primary buffered packets, the primary simultaneous packets delivered from the input terminals to the output terminals in said m-th space switch in at least one of said time periods;

a primary selector for cyclically selecting said primary buffers to successively supply said m-th internal terminal with said primary buffered packets as intermediate packets one at a time;

a single space switch having M input terminals and M output terminals for controllably establishing connection between the input and the output terminals of said single space switch;

secondary input means connected to said first through said M-th internal terminals and to the input terminals of said single space switch for supplying the intermediate packets supplied to said first through said M-th internal terminals to the input terminals of said single space switch as up to M secondary simultaneous packets in each of said time periods;

M secondary buffers connected to the respective output terminals of said single space switch to buffer, as secondary buffered packets, the secondary simultaneous packets delivered from the input terminals to the output terminals in said single space switch in at least one of said time periods; and a secondary selector for cyclically selecting said secondary buffers to successively supply said outgoing terminal with said secondary buffered packets one at a time;

wherein the improvement comprises:

primary control means connected to said primary input means and to said m-th space switch for controlling said m-th space switch so that the connection be established in said m-th space switch in accordance with primary priorities assigned to the input terminals supplied with said up to N primary simultaneous packets; and secondary control means connected to said secondary input means and to said single space switch for controlling said single space switch so that the connection be established in said single space switch in accordance with secondary priorities assigned to the input terminals supplied with said up to M secondary simultaneous packets.

6. A packet concentrating arrangement as claimed in claim 5, the input terminals of said m-th space switch being given serial primary input numbers, respectively, the input terminals of said single space switch being given serial secondary input numbers, respectively, the output terminals of said m-th space switch being given serial primary output numbers, respectively, the output terminals of said single space switch being given serial secondary output numbers, respectively, said primary output numbers corresponding to the respective primary input numbers and being cyclically used on establishing the connection in said m-th space switch in said time periods, said secondary output numbers corresponding to the respective secondary input numbers and being cyclically used on establishing the connection in said single space switch in said time periods; wherein said primary control means assigns serial primary priority numbers in accordance with said primary input numbers to the input terminals supplied in said m-th space switch with the primary simultaneous packets in a first one of said time periods, said primary priority numbers increasing with a decrease in said primary priorities, said primary control means controlling said m-th space switch so that the connection be established between the input terminals assigned with said primary priority numbers and the output terminals of the primary output numbers selected in compliance with primary sums modulo N of said primary priority numbers and a first maximum modulo N of the primary output numbers which are given to the output terminals used in said m-th space switch in the connection in a time period preceding said first one of the time periods;

said secondary control means assigning serial secondary priority numbers in accordance with said secondary input numbers to the input terminals supplied in said single space switch with the secondary simultaneous packets in a second one of said time periods, said secondary priority numbers increasing with a decrease in said secondary priorities, said secondary control means controlling said single space switch so that the connection be established between the input terminals assigned with said secondary priority numbers and the output terminals of the secondary output numbers selected in compliance with secondary sums modulo M of said secondary priority numbers and a second maximum modulo M of the secondary output numbers which are given to the output terminals used in said single space switch in the connection is a time period preceding said one of the time periods.

7. A packet concentrating arrangement as claimed in claim 6, wherein:

said primary input means produces a primary terminal number signal indicative of a primary terminal number which represents how many input terminals of said m-th space switch are supplied with said up to N primary simultaneous packets;

said secondary input means producing a secondary terminal number signal indicative of a secondary terminal number which represents how many input terminals of said single space switch are supplied with said up to M secondary simultaneous packets;

said primary control means comprising:

a primary buffer pointer circuit connected to said primary input means for producing a primary buffer pointer signal indicative of said first maximum in response to said primary terminal number signal; and a primary input and output pair circuit connected to said primary input means and to said primary buffer pointer circuit and keeping said primary priority numbers versus the primary terminal numbers indicated by said primary terminal number signal in said time periods, said primary input and output pair circuit producing a primary input and output pair signal indicative of said primary sums;

said secondary control means comprising:

a secondary buffer pointer circuit connected to said secondary input means for producing a secondary buffer pointer signal indicative of said second maximum in response to said secondary terminal number signal; and a secondary input and output pair circuit connected to said secondary input means and to said secondary buffer pointer circuit and keeping said secondary priority numbers versus the secondary terminal numbers indicated by said secondary terminal number signal in said time periods, said secondary input and output pair circuit producing a secondary input and output pair signal indicative of said secondary sums.

8. A packet concentrating arrangement as claimed in claim 7, wherein:

said primary buffer pointer circuit comprises:

a primary output number read-only memory connected to said primary input means and having a plurality of memory addresses accessed by said primary terminal number signal to produce a primary particular number signal indicating one of said primary output numbers as a primary particular number that is determined by the primary terminal numbers in a first one of said time periods;

a primary single modulo-N adder connected to said primary output number read-only memory and supplied with a primary adder input signal representative of a primary additive number for calculating a primary single sum of said primary particular number and said primary additive number modulo N to produce a primary single sum signal representative of said primary single sum; and a primary latch connected to said primary single adder for latching said primary single sum signal as a primary latched signal to supply said primary latched signal to said primary single adder as said primary adder input signal and to produce said primary latched signal, in a time period succeeding said first one of the time periods, as said primary buffer pointer signal;

said primary input and output pair circuit comprising:

a primary priority read-only memory connected to said primary input means and to said primary latch and having a plurality of memory sectors accessed by said primary terminal number signal to produce up to N primary signals indicative of the primary output numbers determined by the primary priority numbers which are assigned to the input terminals supplied with the primary simultaneous packets in the time period succeeding said first one of the time periods; and N primary modulo-N adders connected to said primary latch and to said primary priority read-only memory for calculating up to N primary sums modulo N of said first maximum and the primary output numbers indicated by said up to N primary signals, said primary input and output pair circuit thereby making said primary input and output pair signal indicate said up to N primary sums;

said secondary buffer pointer circuit comprising:

a secondary output number read-only memory connected to said secondary input means and having a plurality of memory addresses accessed by said secondary terminal number signal to produce a secondary particular number signal indicating one of said secondary output numbers as a secondary particular number that is determined by the secondary terminal number in a second one of said time periods;

a secondary single modulo-M adder connected to said secondary output number read-only memory and supplied with a secondary adder input signal representative of a secondary additive number for calculating a secondary single sum of said secondary particular number and said secondary additive number modulo M to produce a secondary single sum signal representative of said secondary single sum; and a secondary latch connected to said secondary single adder for latching said secondary single sum signal as a secondary latched signal to supply said secondary latched signal to said secondary single adder as said secondary adder input signal and to produce said secondary latched signal, in a time period succeeding said second one of the time periods, as said secondary buffer pointer signal;

said secondary input and output pair circuit comprising: — a secondary priority read-only memory connected to said secondary input means and to said secondary latch and having a plurality of memory sectors accessed by said secondary terminal number signal to produce up to M secondary signals indicative of secondary output numbers determined by the secondary priority numbers which are assigned to the input terminals supplied with the secondary simultaneous packets in the time period succeeding said second one of the time periods; and M secondary modulo-M adders connected to said secondary latch and to said secondary priority read-only memory for calculating up to M secondary sums modulo M of said second maximum and the secondary output numbers indicated by said up to M secondary signals, said secondary input and output pair circuit thereby making said secondary input and output pair signal indicate said up to M secondary sums.

9. A packet switching arrangement including:

M incoming terminals and first through M-th outgoing terminals, where M represents a predetermined integer;

a plurality of intermediate terminals divided into first through M-th terminal groups corresponding to said first through said M-th outgoing terminals, respectively, an m-th terminal group corresponding to an m-th outgoing terminal and consisting of N intermediate terminals, where m is variable between 1 and M, both inclusive, N representing an integer selected for each of said terminal groups;

broadcasting means connected to said incoming terminals and to the intermediate terminals of said terminal groups for broadcasting packets arriving at said incoming terminals to the intermediate terminals of selected ones of said terminal groups according to destinations indicated by the respective packets;

first through M-th space switches corresponding to said first through said M-th terminal groups, respectively, an m-th space switch corresponding to said m-th terminal group and having N input terminals and N output terminals for controllably establishing connection between said input and said output terminals;

input means connected to the intermediate terminals of said terminal groups and to the input terminals of said space switches for supplying the packets broadcast to the intermediate terminals of said m-th terminal group to the input terminals of said m-th space switch as up to N simultaneous packets in each of successive time periods;

N buffers connected to the respective output terminals of said m-th space switch to buffer, as buffered packets, the simultaneous packets delivered from the input terminals to the output terminals in said m-th space switch in at least one of said time periods; and a selector for cyclically selecting said buffers to seccessively supply said m-th outgoing terminal with said buffered packets one at a time;

wherein the improvement comprises control means connected to said input means and to said m-th space switch for controlling said m-th space switch so that the connection be established in said m-th space switch in accordance with priorities assigned to the input terminals supplied with said up to N simultaneous packets.

10. A packet switching arrangement including:

K incoming terminals and first through K-th outgoing terminals, where K represents a predetermined integer;

a greater plurality of intermediate terminals divided into first through K-th terminal families corresponding to said first through said K-th outgoing terminals, respectively, a k-th terminal family corresponding to a k-th outgoing terminal and consisting of a smaller plurality of intermediate terminals which are divided into first through K-th terminal groups, where k is variable between 1 and K, both inclusive, M representing an integer selected for each of said terminal families;

first through M-th internal terminals corresponding to the first through the M-th terminal groups of said k-th terminal family, respectively, an m-th internal terminal corresponding to an m-th terminal group and consisting of N internal terminals, where m is variable between 1 and M, both inclusive, N representing an integer selected for each of the terminal groups of said terminal families;

broadcasting means connected to said incoming terminals and to the intermediate terminals of the terminal groups of said terminal families for broadcasting packets arriving at said incoming terminals to the intermediate terminals of selected ones of the terminal groups of said terminal families according to destinations indicated by the respective packets;

first through M-th space switches corresponding to the first through the M-th terminal groups of said k-th terminal family, respectively, an m-th space switch corresponding to the m-th terminal group of said k-th terminal family and having N input terminals and N output terminals for controllably establishing connection between said input and said output terminals;

primary input means connected to the intermediate terminals of said k-th terminal family and to the input terminals of said first through said M-th space switches for supplying the packets broadcast to the intermediate terminals of the m-th terminal group of said k-th terminal family to the input terminals of said m-th space switch as up to N primary simultaneous packets in each of successive time periods;

N primary buffers connected to the respective output terminals of said m-th space switch to buffer, as primary buffered packets, the primary simultaneous packets delivered from the input terminals to the output terminals in said m-th space switch in at least one of said time periods;

a primary selector for cyclically selecting said primary buffers to successively supply the m-th internal terminal with said primary buffered packets as intermediate packets one at a time;

a single space switch having M input terminals and M output terminals for controllably establishing connection between the input and the output terminals of said single space switch;

secondary input means connected to said first through said M-th internal terminals and to the input terminals of said single space switch for supplying the intermediate packets supplied to said first through said M-th internal terminals to the input terminals of said single space switch as up to M secondary simultaneous packets in each of said time periods;

M secondary buffers connected to the respective output terminals of said single space switch to buffer, as secondary buffered packets, the secondary simultaneous packets delivered from the input terminals to the output terminals in said single space switch in at least one of said time periods; and a secondary selector for cyclically selecting said secondary buffers to successively supply said k-th outgoing terminal with said secondary buffered packets one at a time;

wherein the improvement comprises:

primary control means connected to said primary input means and to said m-th space switch for controlling said m-th space switch so that the connection be established in said m-th space switch in accordance with primary priorities assigned to the input terminals supplied with said up to N primary simultaneous packets; and secondary control means connected to said secondary input means and to said single space switch for controlling said single space switch so that the connection be established in said single space switch in accordance with secondary priorities assigned to the input terminals supplied with said up to M secondary simultaneous packets.

* * * * *